United States Patent
Roth et al.

(10) Patent No.: US 8,091,578 B2
(45) Date of Patent: Jan. 10, 2012

(54) AXIALLY ADJUSTABLE FILL LIMITER VENT VALVE

(75) Inventors: Robert A. Roth, El Paso, TX (US); Sharon E. Beyer, Grand Blanc, MI (US); Ulf Sawert, Grand Blanc, MI (US)

(73) Assignee: Delphi Technologies, Inc., Troy, MI (US)

( * ) Notice: Subject to any disclaimer, the term of this patent is extended or adjusted under 35 U.S.C. 154(b) by 471 days.

(21) Appl. No.: 12/419,405

(22) Filed: Apr. 7, 2009

(65) Prior Publication Data

US 2010/0252125 A1    Oct. 7, 2010

(51) Int. Cl.
*F16K 24/04* (2006.01)
(52) U.S. Cl. ............... 137/202; 137/43; 403/326
(58) Field of Classification Search ........... 137/39, 137/42, 202, 587, 426, 41; 285/25, 29, 82; 403/361, 326
See application file for complete search history.

(56) References Cited

U.S. PATENT DOCUMENTS

| | | | |
|---|---|---|---|
| 4,922,556 A * | 5/1990 | Roosa | 137/426 |
| 5,392,804 A * | 2/1995 | Kondo et al. | 137/202 |
| 5,749,347 A * | 5/1998 | Torii et al. | 137/202 |
| 5,878,775 A * | 3/1999 | Tamburro, Jr. | 137/426 |
| 6,311,675 B2 * | 11/2001 | Crary et al. | 137/202 |
| 6,371,152 B1 * | 4/2002 | Benjey | 137/202 |
| 6,578,597 B2 * | 6/2003 | Groom et al. | 137/43 |
| 6,634,341 B2 * | 10/2003 | Crary et al. | 137/43 |
| 6,863,082 B1 * | 3/2005 | McIntosh et al. | 137/202 |
| 6,866,058 B1 * | 3/2005 | Brock et al. | 137/202 |
| 6,918,405 B2 * | 7/2005 | Leonhardt | 137/202 |
| 7,089,954 B2 | 8/2006 | Crawford | |
| 7,527,064 B2 * | 5/2009 | Kito et al. | 137/39 |
| 7,571,740 B2 * | 8/2009 | Kaneko et al. | 137/202 |

* cited by examiner

*Primary Examiner* — Craig Schneider
*Assistant Examiner* — Craig J Price
(74) *Attorney, Agent, or Firm* — Thomas N. Twomey

(57) ABSTRACT

A fill limiter vent valve (FLVV) adapted for suspension downward into a fuel tank has upper and lower housing members having openings in their cylindrical walls cooperating to define a spill-over level for fuel into the FLVV producing float-initiated vent valve closure during a fuel fill event. The lower housing member has a latching member fixedly engageable with one or more cooperating latching features of the upper housing member in a plurality of relative axial positions; and the spill-over level is varied by relative axial movement of the housing members between those positions. Axial alignment of the latching member and the cooperating latching features is maintained by axially aligned, interacting surface features of the housing members.

13 Claims, 6 Drawing Sheets

AXIALLY ADJUSTABLE FILL LIMITER VENT VALVE

TECHNICAL FIELD

The technical field of this invention is fill limiter vent valves for fuel tanks.

BACKGROUND OF THE INVENTION

A fill limiter vent valve (FLVV) is used in a fuel tank to close a vent opening in the top of the tank in response to liquid fuel in the tank reaching a predetermined fuel shut-off height. After closure of the fill limiter vent valve, the increase in fuel vapor pressure above the liquid in the tank is sensed by appropriate apparatus in the fuel fill nozzle of a fuel supply conduit to automatically shut off fuel delivery to the tank. The fill limiter vent valve is generally mounted in a vent opening in a top wall of the fuel tank and includes a cup having a rim around an open upper end, or a fill opening in the side, positioned to allow fuel to spill into the cup once the fuel level in the tank has reached the level of the rim or the lowest part of the opening. A float within the cup is raised rapidly by the fuel filling the cup to activate the valve to its closed position.

If a manufacturer makes or purchases a variety of different fuel tanks, differences in fuel tank design among the tanks may dictate different predetermined fuel shut-off heights and thus require different fill limiter vent valves, even if the basic FLVV design is the same. A single fill limiter vent valve allowing easy initial height adjustment, during fuel system assembly or FLVV replacement, to provide the desired fuel level shut-off height in each fuel tank design can reduce proliferation of fill limiter vent valve part numbers and reduce inventory costs. Such an adjustable fuel limiter vent valve should also be readily adaptable to equipment and tooling used in automated manufacturing processes, in both adjustment to and locking at, the desired fuel level shut-off height.

SUMMARY OF THE INVENTION

The fill limiter vent valve assembly of this invention has upper and lower housing members each having a cylindrical axial wall with upper and lower axial ends, the upper axial end of the lower housing member being open to permit axially slidable engagement of the upper housing member within and relative to the lower housing member to form a single, axially adjustable housing.

The upper housing member has: (1) an external flange adapted for engaging and closing an opening in a top wall of the fuel tank and suspending the housing downward into the fuel tank, (2) an upper wall closing the upper axial end of its cylindrical wall but defining a vent opening therethrough and a cylindrical fitting adapted for connection of the vent opening to an emission control system, (3) an internal valve mechanism controlling fluid flow through the vent opening, (4) at least one fill opening in its cylindrical wall, and (5) a lower wall member closing the lower end of its cylindrical axial wall but defining at least one upper housing member drain opening.

The internal valve mechanism includes a float axially movable within the upper housing member responsive to fuel level therein; and the float carries a valve closing member and having an upper position in which the valve closing member engages a valve seat around the vent opening to produce a closed condition of the valve and a lower position opening the valve.

The lower housing member includes: (1) a lower wall closing the lower axial end of its cylindrical axial wall but defining at least one lower housing member drain opening, (2) a rim at the upper end of its cylindrical axial wall defining, when it is adjacent and spanning the at least one fill opening of the upper housing member, a minimum spill-over level for fuel from the fuel tank into the upper housing member through the fill opening thereof, and (3) at least one latching member fixedly engageable with one or more cooperating latching features of the cylindrical wall of the upper housing member in a plurality of relative axial positions.

The cylindrical axial walls of the upper and lower housing members have surface features that interact to prevent the latching member of the lower housing member and the cooperating latching features of the upper housing member from rotating out of axial alignment. An example of such surface features comprises, without being limited to, one or more axially extending ridges on one of the housing members engaging corresponding, axially extending slots in the other of the housing members, whereby a predetermined spill-over level of the housing may be set and latched by relative axial sliding of the upper and lower housing members without relative rotation of the upper and lower housing members.

When the adjusted and latched fuel fill vent valve is mounted in a fuel tank in the intended manner, the predetermined spill-over level of the housing defines a fuel shut-off height for fuel within the fuel tank when the tank is filled in the normal manner. In addition, the axially adjustable design is well-suited for automated, latching spill-over level adjustment in a manufacturing environment, as well as manual, latching adjustment of a replacement fuel fill vent valve in a service environment. Further features and equivalent variations of the invention will be apparent from the claims and descriptions of the described preferred embodiments.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
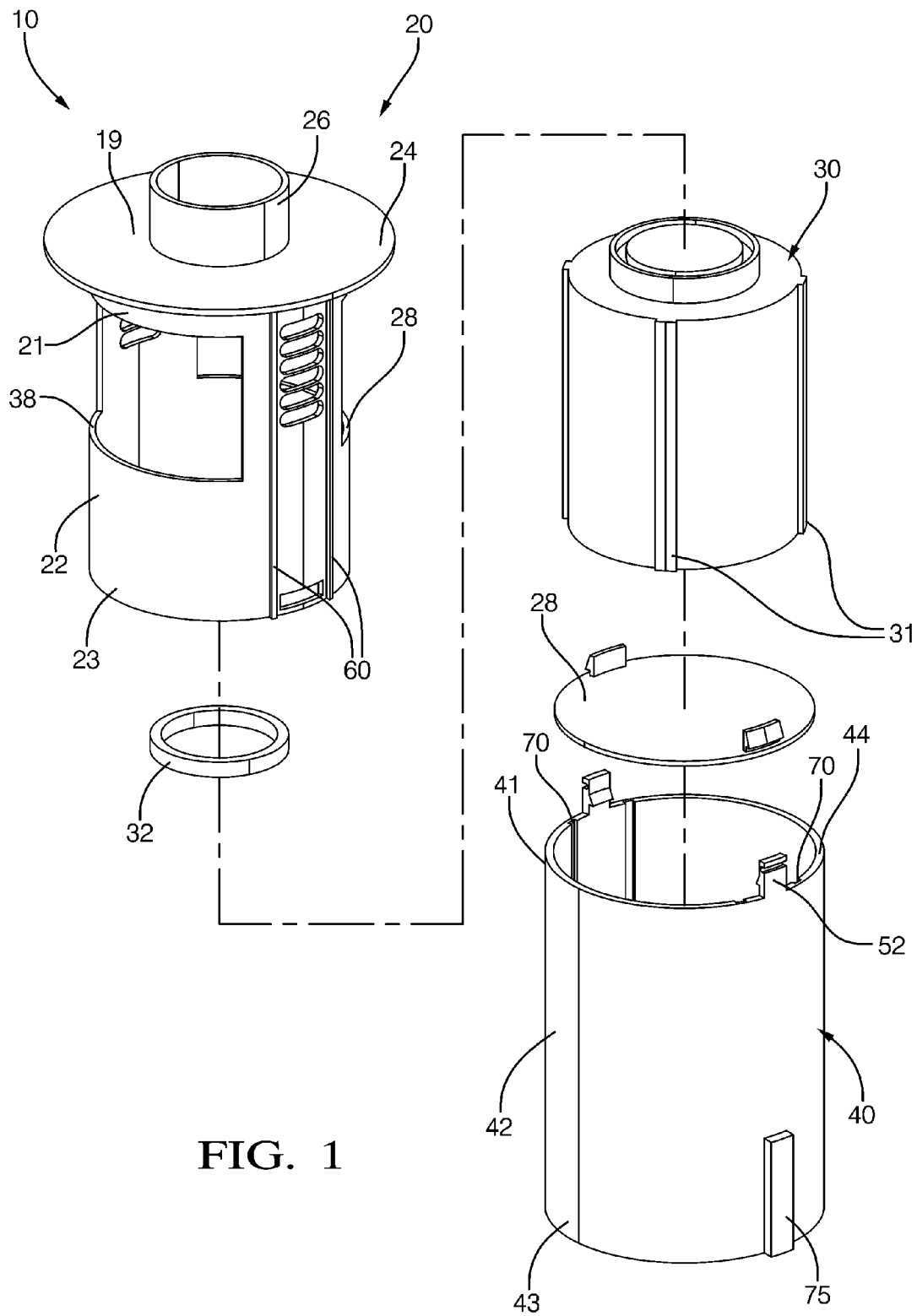
FIG. 1 is an exploded view of a first embodiment of a fill limiter vent valve according to this invention.
Figure 2:
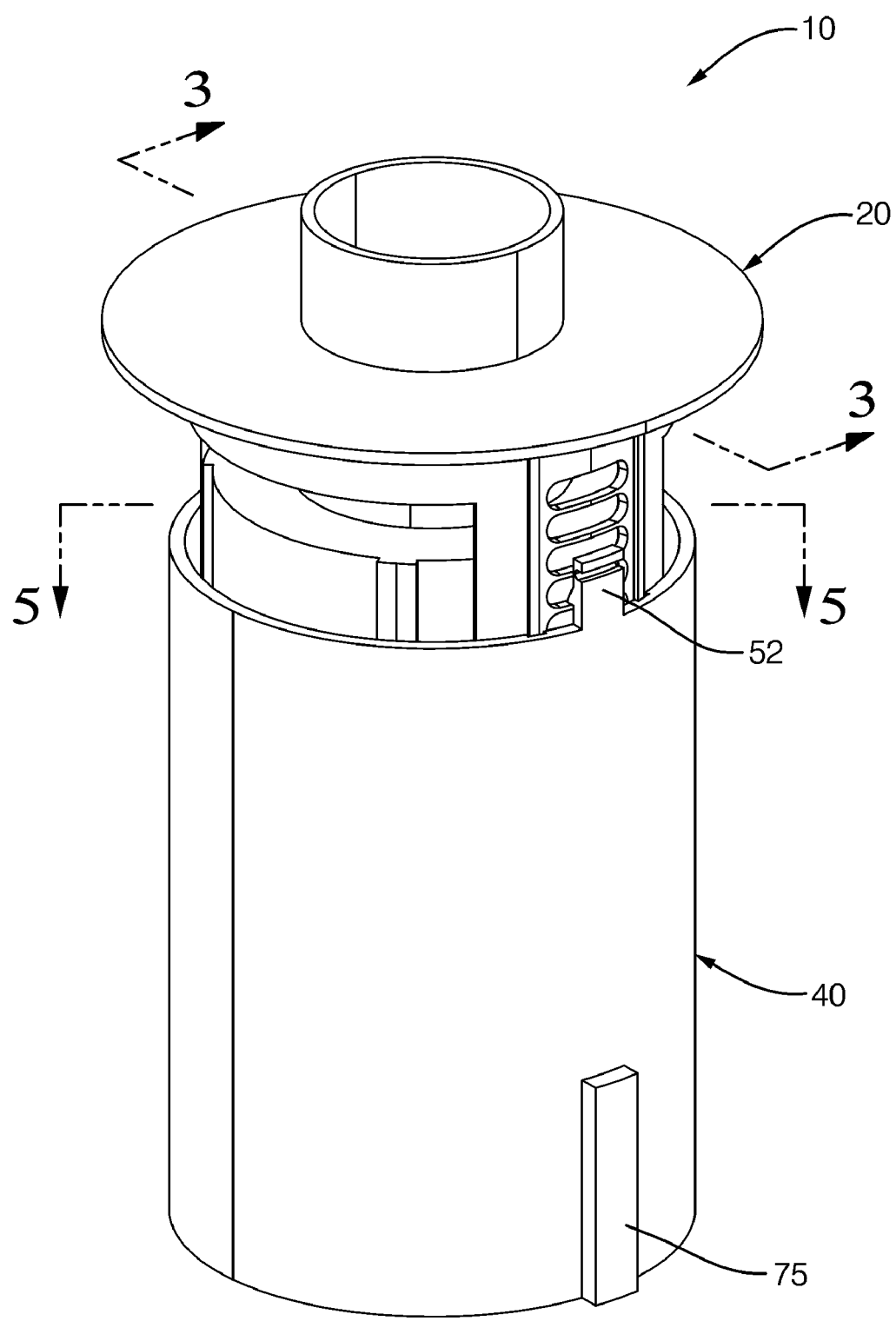
FIG. 2 is a perspective view of the fill limiter vent valve of FIG. 1 prior to locking.
Figure 3:
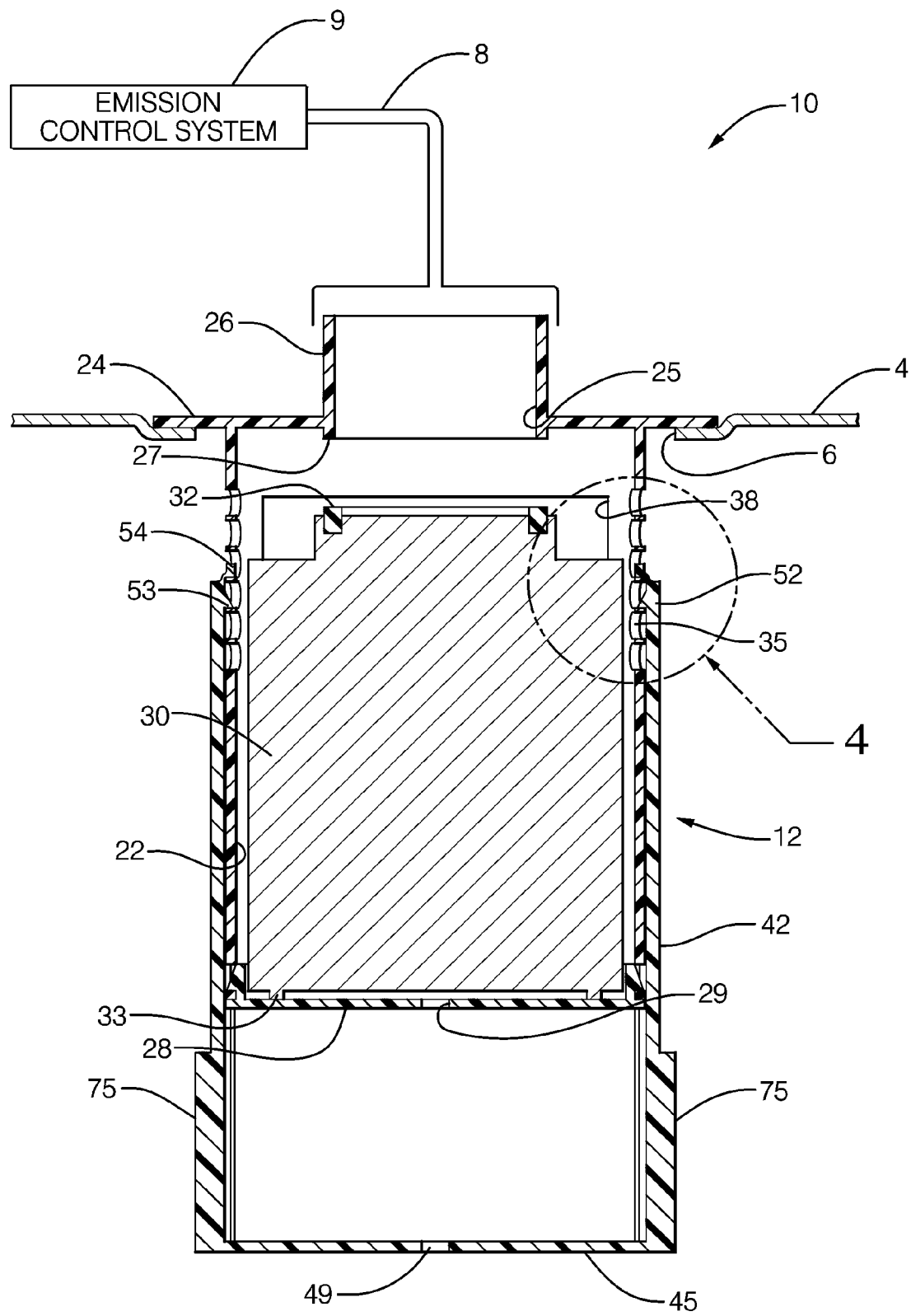
FIG. 3 is an section view along the lines 3-3 in FIG. 2, except that the locking apparatus is shown in its locking position and the fill limiter vent valve is shown mounted on a fuel tank and connected to an emission control system.
Figure 4:
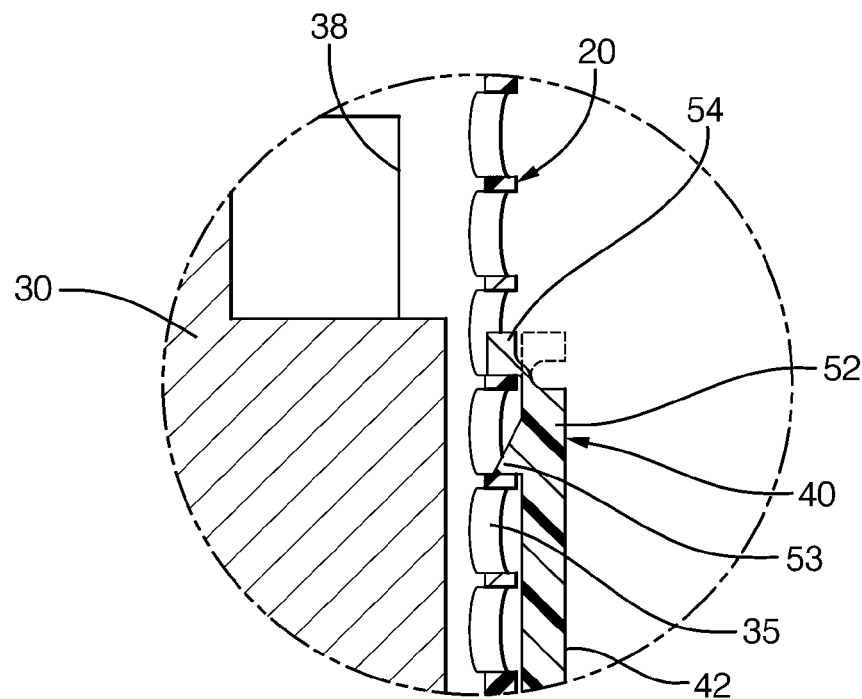
FIG. 4 is an enlargement of the circled portion 4 in the section view of FIG. 3.
Figure 5:
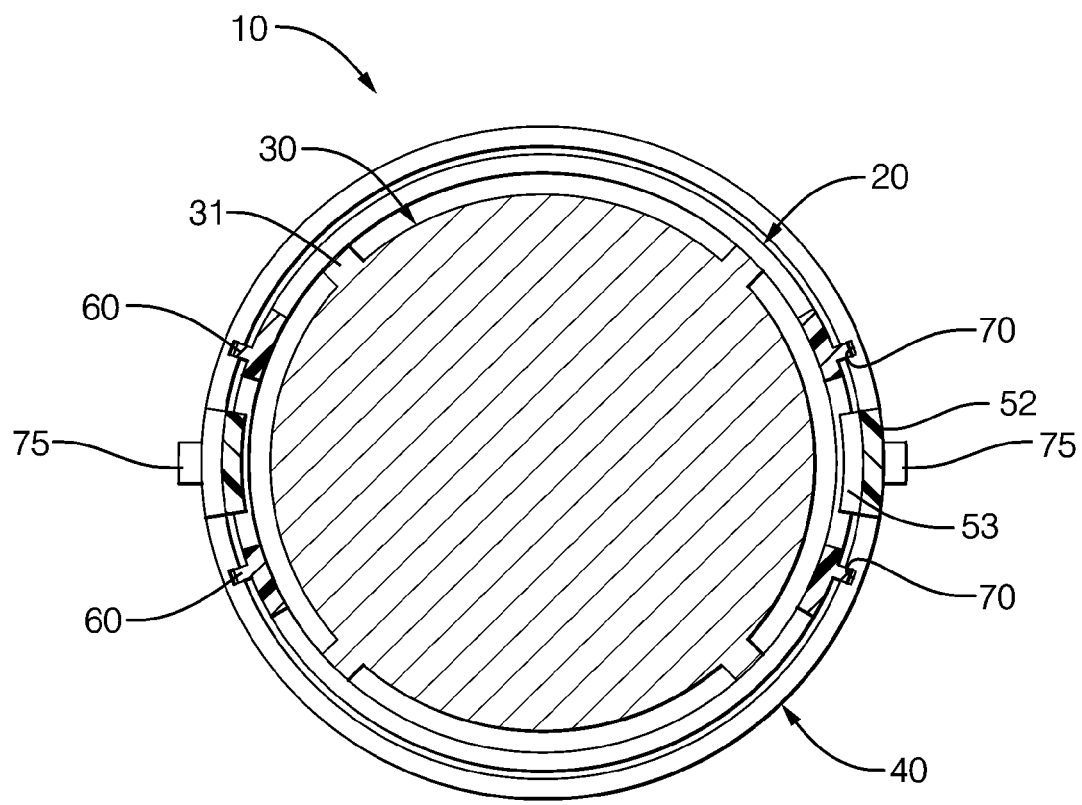
FIG. 5 is a section view along the lines 5-5 in FIG. 2.

Referring to FIG. 1-4, a first embodiment of a fill limiter vent valve (FLVV) assembly 10 is shown supported in a fuel tank 4 (as seen in FIG. 3). Only the top wall of fuel tank 4 is shown; and an opening 6 is provided in this wall for FLVV assembly 10. Opening 6 may be circular, though this is not required by the invention. FLVV assembly 10 includes a cylindrical housing 12, which is shown as circularly cylindrical in this embodiment but may be of a different cross-sectional shape if desired. Housing 12 comprises an upper housing member 20 and a lower housing member 40, each housing member being cylindrical with the same cross-sectional shape but sized so that they are relatively slidable axially, one within the other (for example, with different diameters in the case of circular cross-sections as shown). Upper housing member 20 has a cylindrical wall 22 with an upper axial end 21 closed by an upper wall 19 except as described below and a lower axial end 23 that is closed by a closing member 28, except as described below. Lower housing member 40 has a cylindrical wall 42 with an open upper axial end 41 and a lower axial end 43 that is closed except as described below. Upper axial end 21 of upper housing member 20 and lower axial end 43 of lower housing member 40 define upper and lower axial ends, respectively, of cylindrical housing 12, the axial length of which may by shortened or lengthened by sliding housing members 20 and 40 axially relative to each other.

Upper housing member 20 of housing 12 is supported by the top wall of fuel tank 4 such that housing 12 projects vertically downward into tank 4 through opening 6. In this embodiment, a flange 24 is provided as an extension of upper wall 19 of housing 12. Flange 24 projects radially outwardly from the perimeter of housing member 20 at its upper axial end 21, although other, equivalent constructions will occur to those skilled in the art. Flange 24 is attached and sealed to the upper wall of tank 4 around opening 6 in a known manner to support FLVV assembly 10; and it closes tank 4 at opening 6. In practice, it is likely that FLVV assembly 10 will be a sub-assembly of a collected assembly of devices required for in-tank operation, such as a fuel pump, a fuel level sender unit for a fuel gage, and/or other useful items. Such consolidation of in-tank devices into a single unit assembly has become a much-used design for its convenience in installing and/or removing such devices from a fuel tank. But this precise method of attachment to tank 4 is not a requirement of this invention; and there exist many such methods of support known and practiced in the art.

Upper wall 19 of upper housing member 20 is provided with a vent opening 25 therethrough and an external cylindrical fitting 26 surrounding vent opening 25 for the attachment of a conduit 8 to conduct fuel vapors from the top of tank 4 through vent opening 25 to a fuel vapor canister or similar device of an emission control system 9 in the usual manner. A valve seat 27 is formed within upper housing member 20 on or adjacent the lower end of fitting 26 surrounding the rim of vent opening 25, so that the escape of fuel vapor from FLVV assembly 10 through vent opening 25 may be controlled by a valve closing member 32 mounted on the upper side of a float 30 contained within upper housing member 20 in a manner to be described below.

One or more fill openings 38 are provided in cylindrical wall 22 of upper housing member 20 (in the embodiment as shown, these fill openings 38 are provided on opposing sides of cylindrical wall 22). To allow a high fuel flow rate through fill opening(s) 38 into housing 12 when the fuel level in tank 4 reaches its lower rim, each fill opening 38 extends circumferentially in cylindrical wall 22 for a significant distance and further extends axially for a distance sufficient to allow such flow throughout the range of lockable positions in the axial adjustment of fuel fill vent valve 10 as described below. Cylindrical wall 42 of lower housing member 40 engages cylindrical wall 22 of upper housing member 20 on the outside thereof in an axially slidable manner; and the (open) upper end 43 of cylindrical wall 42 defines a horizontal rim 44 spanning fill openings 38 of upper housing member 20 to define a spill-over level which fuel in fuel tank 4 must exceed in order to enter housing 12. This spill-over level is adjustable by axial movement of upper and lower housing members 20 and 40. With FLVV assembly 10 installed in fuel tank 4 as shown in FIG. 3, the spill-over level defines a specific fuel fill limit height relative to the top wall of fuel tank 4.

Float 30 may be inserted into housing 20 prior to the closing of the latter by member 28. With member 28 closing housing member 20 and float 30 not supported by fuel, float 30 rests on member 28 at the bottom of housing member 20. Float 30 preferably takes up a substantial volume of the space within upper housing member 20 and preferably has one or more axially extending ribs 31 creating a narrow surrounding space between float 30 and axial wall 22. Float 30 also preferably has one or more feet 33 creating a narrow space underneath float 30. When resting on member 28, valve closing member 32 is separated from valve seat 27; and fuel vapor can escape tank 4 through vent opening 25. But when, during a fuel fill event, the fuel level within fuel tank 4 reaches rim 44 at the upper end 41 of lower housing member 40, fuel spills over rim 44 and through fill openings 38 of upper housing member 20 to rapidly fill the volume around and under float 30. Float 30 is thus quickly raised (preferably a short distance) to a level wherein valve closing member 32 engages valve seat 27 to firmly close the valve and prevent further fuel vapor from escaping fuel tank 4. Additional fuel entering fuel tank 4 then raises the internal vapor pressure within tank 4 to trigger the standard, automatic fuel shut-off mechanism in the fuel fill nozzle and thus end the fuel fill event. The fuel shut-off height of fuel tank 4 is a function of the spill-over level of FLVV assembly 10 and can be set by axial adjustment of housing 12 of FLVV assembly 10 prior to its installation in fuel tank 4.

At least one fuel drain opening 29 is provided through member 28 or through the lower end 23 of cylindrical wall 22 to allow drainage of fuel out of upper housing member 20 when the fuel level in fuel tank 4 drops below the spill-over level of FLVV assembly 10 during vehicle use. Furthermore, a corresponding drain opening 49 is provided in lower wall 45 (or the lower end 43 of cylindrical wall 42) of lower housing member 40 to allow drainage out of housing 12 into fuel tank 4 when the fuel level in tank 4 drops below drain opening 49. The purpose of these drain openings is to empty housing 12 of fuel as the fuel level in tank 4 falls in preparation for the next fuel fill event. Drain openings 29 and 49 should be made quite small in area, relative to the size of fill openings 38, so that fuel flow therethrough is slow compared with the rate of fuel level increase in fuel tank 4 during a fuel fill event and thus will not adversely affect the operation of FLVV assembly. It should be noted that drain openings 29 and 49 are shown to be seen in the drawings rather than drawn to scale (and are thus likely to be smaller in diameter than they appear).

As previously stated, the spill-over level of FLVV assembly 10 is adjustable prior to its installation in fuel tank 4 to provide a predetermined fuel shut-off height for fuel tank 4 after such installation. This adjustment is performed by pushing upper and lower housing members 20, 40 of housing 12 axially together (from an initial extreme total axial length of housing 12) until a predetermined axial length of housing 12 is reached and then locking upper and lower housing members 20, 40 in this relative axial position. This adjustment procedure is facilitated by the provision of one or more (two in this embodiment) latching members on lower housing member 40 engageable with cooperating latching features on cylindrical wall 22 of upper housing member 20 in a plurality of relative axial positions.

The latching members in this embodiment comprise a pair of latching arms 52 extending axially upward from upper end 41 of lower housing member 40, on diametrically opposing sides thereof. These latching arms 52 are preferably formed as axial extensions of cylindrical wall 42; and each is provided near its upper end with a radially inwardly projecting ratchet 53 for engagement with latching features, one at a time in relative axial motion. In this embodiment, the latching features comprise an axially extending row of latch openings or indentations 35 in cylindrical wall 22 of upper housing member 20. Ratchet 53 has an essentially right triangular cross-sectional shape, with a lower side essentially perpendicular to latching arm 52 and an upper side ramped at an acute angle relative to latching arm 52. The upper end of latching arm 52, where ratchet 53 is located, is resiliently deformed in a radially outward direction by axial wall 22 when ratchet 53 is not in engagement with any of latch openings or indentations 35 (that is, between adjacent openings or indentations 35). Thus, when ratchet 53 encounters a latch opening or indentation 35, latching arm 52 springs back from its deformed condition to force ratchet 53 into the encountered latch opening or indentation. In this engaged condition, the perpendicular lower side of ratchet 53 prevents downward axial movement of latching arm 52, and thus of lower housing member 40, relative to upper housing member 20. But, if lower housing member 40 is pushed axially further upward (that is, in the housing shortening direction) relative to upper housing member 20, the ramped upper side of ratchet 53 once again forces the upper end of latching arm 52 radially outward, so that ratchet 53 is disengaged from the latch opening or indentation 35 and moved axially across the radially outer surface of axial wall 22 to engage the next one of latch openings or indentations 35. Thus, axial adjustment of housing 12 is normally possible only in the axially shortening direction in the normal adjustment process.

If housing 12 is received in its axially longest position, upper and lower housing members 20, 40 may be pushed axially together, with ratchets 53 advancing from each one of the latch openings or indentations 35 to the next, until it engages the one defining the desired spill-over level. Of course, it is possible, if the axial adjustment is accidentally pushed too far, for housing 12 to be elongated by manually biasing the upper ends of latching arms 52 outward so that ratchets 53 are prevented from performing their normal ratchet function of preventing such housing elongation. This allows recovery from mistakes, especially in the installation of replacement parts in the field; but it should not be necessary in original manufacture, wherein automated equipment may be used to consistently provide the desired spill-over level.

Once the desired spill-over level is attained, ratchets 53 of latching members 52 will prevent changes in relative axial position of upper and lower housing members 20, 40 in elongation; but they will not, by themselves, prevent further movement in the opposite, shortening direction. To prevent such further shortening and lock housing 12 in the desired relative axial position, the free end of each latching member 52 is formed into a locking member 54 that can be non-resiliently deformed in a radially inwardly direction to engage the same or another one of latch openings or indentations 35, where it will stay to prevent further relative axial movement of upper and lower housing members 20, 40 in the axially shortening direction. In this preferred embodiment, for example, locking member 54 is axially spaced from ratchet 53 by a distance such that, when ratchet 53 is engaged in one of latch openings or indentations 35, locking member 54 may be pushed axially inward into the next one of latch openings or indentations 35 in the axial row. Latching arm 52 is made thinner at some point between ratchet 53 and locking member 54 to allow non-resilient bending at that point, so that locking member 54 may stay engaged in its own latch opening or indentation 35. With locking member 54 so engaged, further axial movement of latching arm 52, and thus lower housing member 40, in the housing shortening direction is prevented; and housing 12 is locked in a position providing the desired spill-over level to determine the corresponding desired fuel limit height in fuel tank 4.

For ratchets 53 and locking members 54, carried by the latching members 52 of lower housing member, to reliably engage latch openings or indentations 35 of upper housing member 20, upper and lower housing members 20, 40 must maintain a consistent, predetermined rotational orientation relative to each other during relative axial motion (as determined by the circumferential extent of latch openings or indentations 35). This may be accomplished, for example, by providing an arrangement of one or more axially extending ridges on one of housing members 20 and 40 engaging one or more corresponding slots on the other of housing members 20 and 40 to prevent relative rotation therebetween. In this embodiment, for example, an axially aligned external ridge 60 is formed on the radially outer surface of cylindrical wall 22 of upper housing member 20 on each side of, and adjacent, the axial row of latch openings or indentations 35. A pair of corresponding, axially aligned slots 70 is also formed on the radially inner surface of cylindrical wall 42 of lower housing member 40, with each slot 70 located to slidably engage one of external ridges 60. Once upper and lower housing members 20, 40 are axially engaged to form housing 12, relative rotation of upper and lower housing members 20, 40 will be prevented in either rotational direction external ridges 60 engaged with cooperating slots 70. It should be noted that, if upper and lower cylindrical walls are not circularly cylindrical (for example, polygonal, elliptical, etc.), their relative rotation may be sufficiently prevented by their non-circular cross sectional shape so that no such ridges and slots would be required.

In the adjustment of FLVV assembly 10, relative rotation of the upper and lower housing members 20, 40 is neither required nor permitted; and this considerably reduces the complexity and expense of the tooling used to adjust the spill-over level in mass production. The adjustment begins with upper and lower housing members 20, 40 of FLVV assembly 10 engaged—but not locked—in an axial position equal to or longer than that producing the lowest (relative to the top of fuel tank 4) spill-over level (that is, the longest axial length of housing 12) for any of its applications. FLVV assembly 10 may then be placed with its lower housing member 40 in a cup shaped depression in a die of an adjustment tool on an assembly line. The adjustment is performed in two steps. First, a tool member comes down against upper housing member 20 to push housing members 20 and 40 together until the desired spill-over level is reached, whereupon ratchets 53 of the locking members 52 will each be disposed engaging the one of latch openings or indentations 35 producing the desired spill-over level. Second, tool arms approach locking members 54 on the ends of latching members 52 and push them into the appropriate latch openings or indentations 35 to lock upper and lower housing members 20 and 40 together in the desired relative axial position. Although no relative rotation of the upper and lower housing members is required (or permitted) in this process, the second step requires that the entire FLVV assembly 10 be properly oriented rotationally so that the tool arms approaching radially in the second step will accurately engage locking members 54. This proper rotational position may be established when FLVV assembly 10 is first loaded into the die by means of axially extending rotational alignment ridges 75 on the outside of cylindrical wall 42 of lower housing member 40. Rotational alignment ridges 75 are shown, in this embodiment, as two in number, disposed on diametrically opposed outer sides of cylindrical wall 42 and generally aligned with latching arms 52; but their number and specific locations are not restricted to those shown. Matching slots are present in the die; and the ridge(s) 75 will not allow entry of lower housing member 40 into the die until they line up with the matching axial slot(s) in the die, whereupon the FLVV assembly in the die will be rotationally oriented for engagement of locking members 54 by the tool arms at the proper time to perform the locking step.

If FLVV assembly 10 is part of a multi-device, in-tank assembly, its structure according to this invention can provide an additional benefit in its incorporation into the greater assembly. In such a greater assembly, the opening in fuel tank 6 would be spanned and closed by a generally flat mounting plate of the greater assembly, not shown herein, on which all devices of the greater assembly would be mounted. This mounting plate would be held in an upper die; and an opening would be provided in the mounting plate for cylindrical fitting 26, with a sealing member of some kind (also not shown) included. FLVV assembly 10 would be loaded, in its axially extended state, in the lower die and pushed upward with cylindrical fitting 26 pushed up through the opening in the mounting plate until the upper wall 19 (and flange 24 if present) of upper housing member 20 engages the lower side of the plate to prevent further upward movement and the sealing member of the previous sentence provides sealing between cylindrical fitting 26 and the mounting plate. This engagement of FLVV assembly 10 to the plate could be held by any known method of joining FLVV assembly 10 to the mounting plate. In the method of assembly described in the previous paragraph, the axial adjustment of the upper and lower housing members 20, 40 to produce and lock the desired spill-over level of FLVV assembly 10 could be accomplished by continuing the upward push of lower housing member 40 by the lower die to axially compress FLVV assembly 10, since upper housing member 20 is now prevented from further upward movement. The axial adjustment and locking of FLVV assembly 10 in its desired spill-over level state is thus combined in a single overall operation with the mounting of FLVV assembly 10 to the mounting plate of the greater assembly. As described, the order of the sub-operations of (a) the mounting of FLVV assembly 10 on the mounting plate and (b) the axial adjustment and locking of FLVV assembly 10 depends on providing less axial sliding resistance in the former sub-operation than the latter, or otherwise preventing the latter until the former is accomplished, so that FLVV assembly 10 is mounted before it is adjusted. An expeditious way to accomplish this is to form upper housing member 20 (typically by integral molding) as part of the mounting plate of the greater assembly, thus eliminating the necessity for the FLVV assembly mounting sub-operation.

Figure 6:
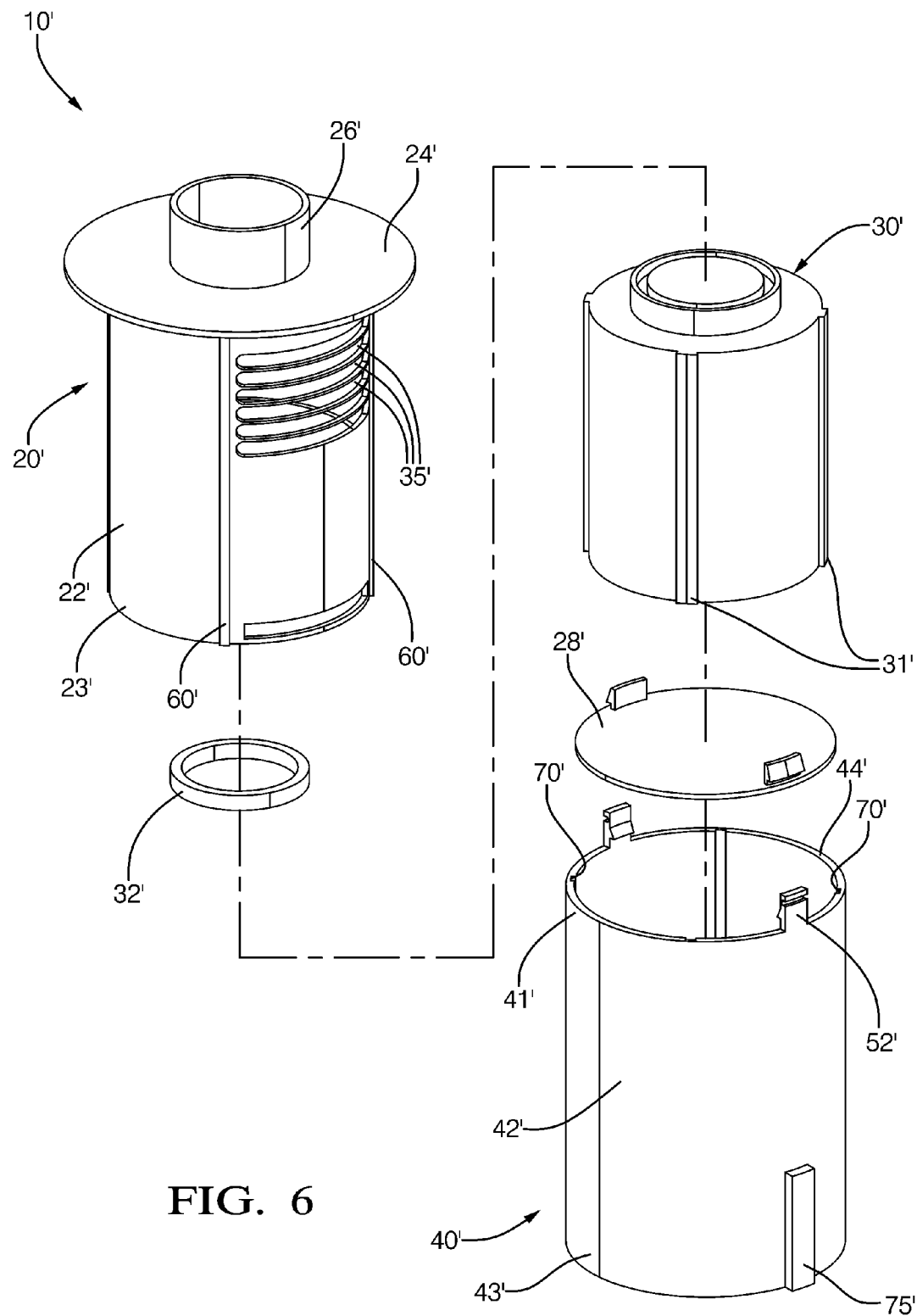
FIG. 6 is an exploded view of an alternative embodiment of the fill limiter vent valve of this invention.
Figure 7:
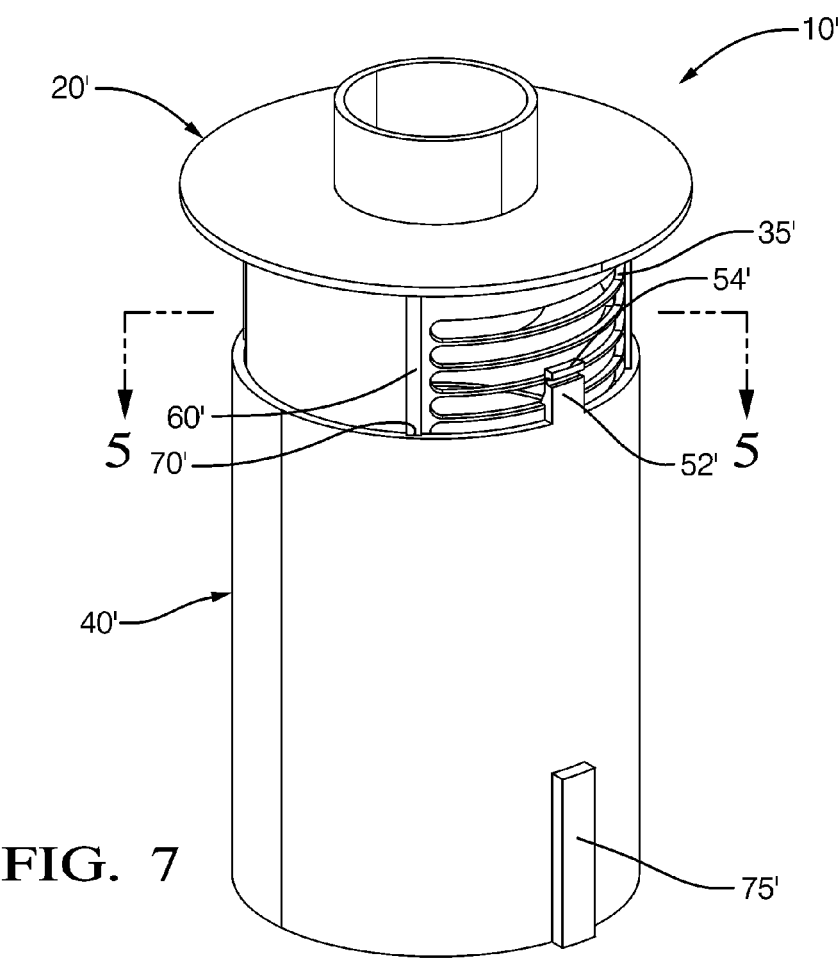
FIG. 7 is a perspective view of the fill limiter vent valve of FIG. 6 prior to locking.
Figure 8:
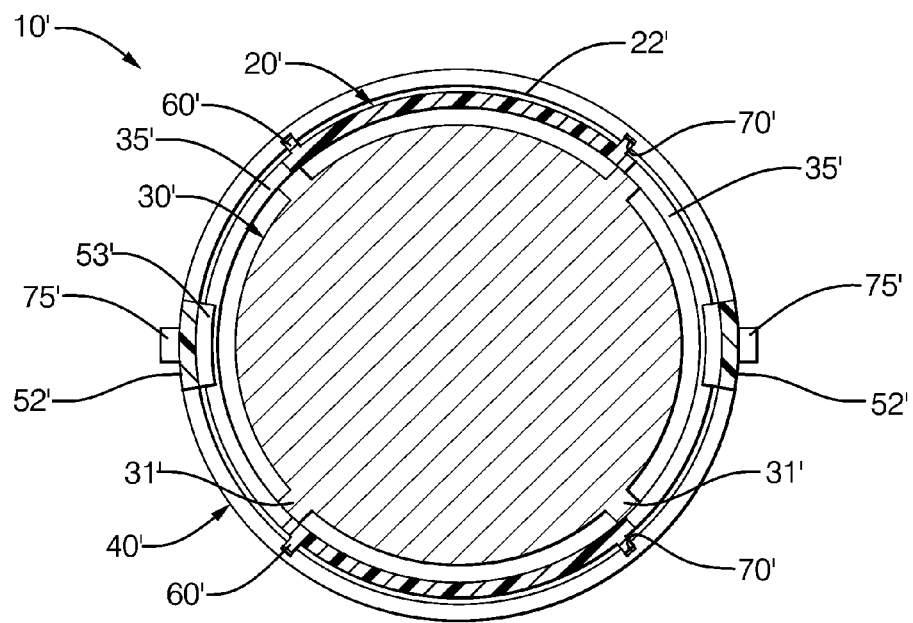
FIG. 8 is a section view along lines 8-8 in FIG. 7.

If latch openings or indentations 35 are actually openings through axial wall 22 of upper housing 20, then they may, in an alternative embodiment of this invention, also perform the function of fill openings 38. Such an alternative embodiment shown in FIG. 6-8, is essentially identical with that of FIG. 1-5, with the following structural modifications: (1) elimination of fill openings 38, which are replaced by latch/fill openings 35'; (2) circumferential extension of latch/fill openings 35' as required for adequate spill-over flow capacity of fuel into FLVV assembly 10' in each latchable, relative axial position of housing members 20' and 40'; and (3) circumferential shifting of the engaging axial ridges 60' and slots 70' to maintain their position relative to the circumferentially extended latch/fill openings 35'. With these exceptions, the structure of FLVV assembly 10' in FIG. 6-8 is essentially the same as that of FLVV assembly 10 in FIG. 1-5; and all reference numbers of FIG. 6-8 are the same as those referencing the corresponding part of the embodiment of FIG. 1, except that they are primed. In the embodiment of FIG. 6, latch/fill openings 35' combine the functions of latch openings 35 and fill openings 38 of the embodiment shown in FIG. 1-5. Each of latch/fill openings 35' may be designed to have a lower horizontal edge approximately even with rim 44' at the upper end 41' of lower housing member 40' in a separate one of the latchable positions of FLVV assembly 10' so as to provide an optimal fuel flow area into housing 20' as previously discussed.

The invention claimed is:

1. A fill limiter vent valve for a fuel tank comprising:

upper and lower housing members each having a cylindrical axial wall with upper and lower axial ends, the upper axial end of the lower housing member being open to permit axially slidable engagement of the upper housing member within and relative to the lower housing member to form a single, axially adjustable housing;

the upper housing member having (1) an external flange adapted for suspending the housing downward into the fuel tank, (2) an upper wall closing the upper axial end of its cylindrical wall but defining a vent opening therethrough and a cylindrical fitting adapted for connection of the vent opening to an emission control system, (3) an internal valve mechanism controlling fluid flow through the vent opening, (4) at least one fill opening in its cylindrical wall, and (5) a lower wall member closing the lower end of its cylindrical axial wall but defining at least one upper housing member drain opening;

the internal valve mechanism comprising a float axially movable within the upper housing member responsive to fuel level therein, the float carrying a valve closing member and having an upper position in which the valve closing member engages a valve seat around the vent opening to produce a closed condition of the valve and further having a lower position opening the valve;

the lower housing member having (1) a lower wall closing the lower axial end of its cylindrical axial wall but defining at least one lower housing member drain opening, (2) a rim at its open upper end defining, when it spans the at least one fill opening of the upper housing member, a minimum spill-over level for fuel from the fuel tank into the upper housing member through its at least one fill opening, and (3) a latching member fixedly engageable with one or more cooperating latching features of the cylindrical wall of the upper housing member in a plurality of relative axial positions; and the cylindrical axial walls of the upper and lower housing members having interacting surface features preventing relative rotation of the latching member of the lower housing member and the cooperating latching features of the upper housing member out of axial alignment while allowing relative axial movement, whereby a predetermined spill-over level of the housing may be set and latched by relative axial sliding of the upper and lower housing members without relative rotation of the upper and lower housing members.

2. A fill limiter vent valve according to claim 1 wherein the at least one fill opening in the cylindrical wall of the upper housing member comprises a pair of diametrically opposed, circumferentially extending openings.

3. A fill limiter vent valve according to claim 1 wherein the at least one latching member comprises a resilient latching arm carrying a ratchet engaging consecutive ones of the latching features of the upper housing member with axially compressive relative movement of the upper and lower housing members but preventing axially elongating relative movement thereof.

4. A fill limiter vent valve according to claim 3 further including a locking member for fixing the relative axial position of the upper and lower housing members with the latching member engaging a selected one of the latching features of the upper housing member.

5. A fill limiter vent valve according to claim 4 wherein the locking member comprises a portion of the latching member that is independently engageable with at least one of the latching features of the upper housing member.

6. A fill limiter vent valve according to claim 1 wherein the latching features of the upper housing member comprise a plurality of axially aligned openings in the cylindrical wall of the upper housing member.

7. A fill limiter vent valve according to claim 6 wherein the at least one fill opening in the cylindrical wall of the upper housing member comprises the plurality of axially aligned openings.

8. A fill limiter vent valve according to claim 7 wherein the at least one latching member comprises a resilient latching arm carrying a ratchet engaging consecutive ones of the axially aligned openings of the upper housing member with axially compressive movement of the upper and lower housing members but preventing axially elongating movement thereof.

9. A fill limiter vent valve according to claim 8 further including a locking member for fixing the relative axial position of the upper and lower housing members with the latching member engaging a selected one of the axially aligned openings of the upper housing member.

10. A fill limiter vent valve according to claim 9 wherein the locking member comprises a portion of the latching member that is independently engageable with at least one of the axially spaced openings.

11. A fill limiter vent valve according to claim 10 wherein the at least one of the axially spaced openings engageable by the locking member is different from the selected one of the axially spaced openings engaged by the latching member.

12. A fill limiter vent valve according to claim 1 wherein the surface features comprise one or more axially extending ridges on a surface of the cylindrical axial wall of one of the first and second housing members engaging corresponding, axially extending slots in the surface of the cylindrical axial wall of the other of the first and second housing members to prevent relative rotation thereof.

13. A fill limiter vent valve according to claim 12 wherein the axially extending ridges are on the cylindrical axial wall of the upper housing member and the axially extending slots are on the cylindrical axial wall of the lower housing member.

* * * * *